United States Patent
Tondering

(10) Patent No.: US 7,099,943 B1
(45) Date of Patent: Aug. 29, 2006

(54) REGULATING USAGE OF COMPUTER RESOURCES

(75) Inventor: Claus Tondering, Lyngby (DK)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/384,932

(22) Filed: Aug. 26, 1999

Related U.S. Application Data

(60) Provisional application No. 60/097,912, filed on Aug. 26, 1998.

(51) Int. Cl.
*G06F 15/173* (2006.01)
*G06F 15/16* (2006.01)

(52) U.S. Cl. .................. 709/226; 709/229; 370/230; 370/235.1

(58) Field of Classification Search ........... 709/100, 709/104, 223–226, 102, 227–235, 217–219; 370/235–235.1; 718/102–106
See application file for complete search history.

(56) References Cited

U.S. PATENT DOCUMENTS

| | | | | |
|---|---|---|---|---|
| 5,828,878 A * | 10/1998 | Bennett | ............... | 709/102 |
| 5,889,956 A * | 3/1999 | Hauser et al. | ............... | 709/226 |
| 6,016,503 A * | 1/2000 | Overby et al. | ............... | 709/1 |
| 6,069,872 A * | 5/2000 | Bonomi et al. | ............... | 370/389 |
| 6,112,085 A * | 8/2000 | Garner et al. | ............... | 455/428 |
| 6,125,396 A * | 9/2000 | Lowe | ............... | 709/234 |
| 6,151,688 A * | 11/2000 | Wipfel et al. | ............... | 709/224 |
| 6,240,091 B1 * | 5/2001 | Ginzboorg et al. | ............... | 709/229 |
| 6,243,358 B1 * | 6/2001 | Monin | ............... | 370/229 |
| 6,289,012 B1 * | 9/2001 | Harrington et al. | ............... | 370/389 |
| 6,330,313 B1 * | 12/2001 | Hunt | ............... | 379/112.04 |
| 6,529,475 B1 * | 3/2003 | Wan et al. | ............... | 370/231 |
| 6,578,082 B1 * | 6/2003 | Ho et al. | ............... | 709/233 |
| 6,981,051 B1 * | 12/2005 | Eydelman et al. | ............... | 709/232 |

OTHER PUBLICATIONS

Nicola et al., "Fast Stimulation of the Leaky Bucket Algrorithm" Proceedings of the 1994 Winter simulation Conferences; Society for Computer Simulation International (c) 1994.*

* cited by examiner

*Primary Examiner*—David Wiley
*Assistant Examiner*—Joseph E. Avellino
(74) *Attorney, Agent, or Firm*—Fish & Richardson P.C.

(57) ABSTRACT

A method is described that can be used to regulate the usage of resources in a network system. A software tool can be used to regulate access to a system resource. The preferred method uses a software tool to enforce voluntary restraint on the uses of resources by competing processes. Further, the software tool can be used to request additional usage time for more important or sensitive processes requesting a specific resource. The preferred method can be used with a general computing environment or in an embedded system.

31 Claims, 1 Drawing Sheet

REGULATING USAGE OF COMPUTER RESOURCES

CROSS-REFERENCE TO RELATED APPLICATIONS

This application claims the priority of U.S. Provisional Patent Application No. 60/097,912, filed Aug. 26, 1998.

BACKGROUND OF THE INVENTION

The present invention relates generally to networks, and more particularly, to a method for regulating the usage of resources in such networks.

Networks, such as local area networks (LANs), are used for interconnecting many different devices, such as computers and peripherals, to allow users to communicate with one another. Further, these networks are used to allow users to share access to the connected peripherals. The LAN may be a heterogeneous LAN in which many different communication protocols are carried on a single Ethernet or token-ring medium. Examples of different protocols are IPX, which is typically used by DOS-based PCs and UDP/IP, which is typically used by UNIX-based work stations. Each type of device may be adapted through software to communicate using multiple different protocols.

A peripheral also can include software. The software is in the form of multiple protocol stack modules that allow the peripheral to communicate using multiple protocols in order to be shared on a heterogeneous LAN. A protocol stack is a software module that processes packets of data which are received from or transmitted to the LAN using the corresponding protocol. The protocol stacks in the associated lower-level software for network communications are typically stored and executed on a network interface device that may be embedded in or attached to the peripheral. The network interface device serves as an interface which allows the peripheral to communicate with other network devices via the LAN.

Due to the large number of users and devices associated with the LAN, various potentially unrelated devices (e.g., spawned by separate applications) compete for finite system resources, such as memory allocation space, disk access, and processor time. A device typically requests usage of a resource from the system's operating system. If the resource is not being used, the operating system grants access. In some networking environments, the device is allowed to use and hold the resource indefinitely. This can block other processes access to the same resource. This results in delays in or a potential catastrophic failure of the system. This may occur, for example, when one device is more important and/or urgent than another. For example, the industrial process control of a nuclear reactor may be more important than down loading information from the Internet.

Many techniques have been developed to regulate computer resource usage in a network system. For example, a maximum time limit for the usage of a given resource may be used. One drawback to this technique is that a specific device may require more than the specific maximum time limit to execute a specific resource.

Another known technique is to fix a process time that is substantially the same for each resource. Again, this technique has certain drawbacks that include not allowing a process to execute a resource for an extended period of time to perform an important function.

SUMMARY OF THE INVENTION

In general, in one aspect, the invention is directed to a method of managing usage in a network system that includes indicating available credit for usage of a resource, and regulating usage of the resource by a process based on the indicated available credit.

Implementations of the invention include one or more of the following. The resource may be a memory space or system processor time. The network may be an embedded computer system, or may operate in a real-time networking environment. The method may be modeled as a leaky bucket. The available credit may be modified by adjusting a maximum resource usage value of the resource. A message may be sent to a process waiting to use a resource when the available credit exceeds a specified amount.

In another aspect, the invention is directed to a method of managing a plurality of resources in a network having a plurality of devices that includes creating a software tool corresponding to each of the plurality of resources on each of the plurality of devices accessing the plurality of resources. The software tool may be used to regulate the usage of any of the plurality of resources by any of the plurality of devices.

Implementations of the invention include one or more of the following. A descriptor representative of any of the software tools may be allocated to any of the plurality of devices. Each software tool may be associated with a maximum usage level. The maximum usage level of the software tool may be decremented in response to the use of the resource associated with the tool by any of the devices. An available credit based on the usage of the resource associated with the tool may be calculated as a function of the maximum usage level. A device waiting to use the resource associated with the tool can be informed of the available credit. A message may be sent to a network address associated with the waiting device to indicate when the available credit exceeds a specified usage level. The maximum usage level may be incremented to at least correspond to the specified usage level. The maximum usage level may be overridden to allow a device access to one of the resources. The software tool may be destroyed in response to a request from one of the devices.

In yet another aspect, the invention is directed to a network including a plurality of devices having a plurality of resources running in the network. The network may include computer software residing on a computer readable medium at each device accessing the plurality of resources that cause the device to indicate available credit for usage of one of the resources, and regulates the usage of the resource by a device based on the indicated available credit.

Other advantages will be come apparent from the following description including the drawings and the claims.

DESCRIPTION OF THE PREFERRED EMBODIMENTS

Figure 1:
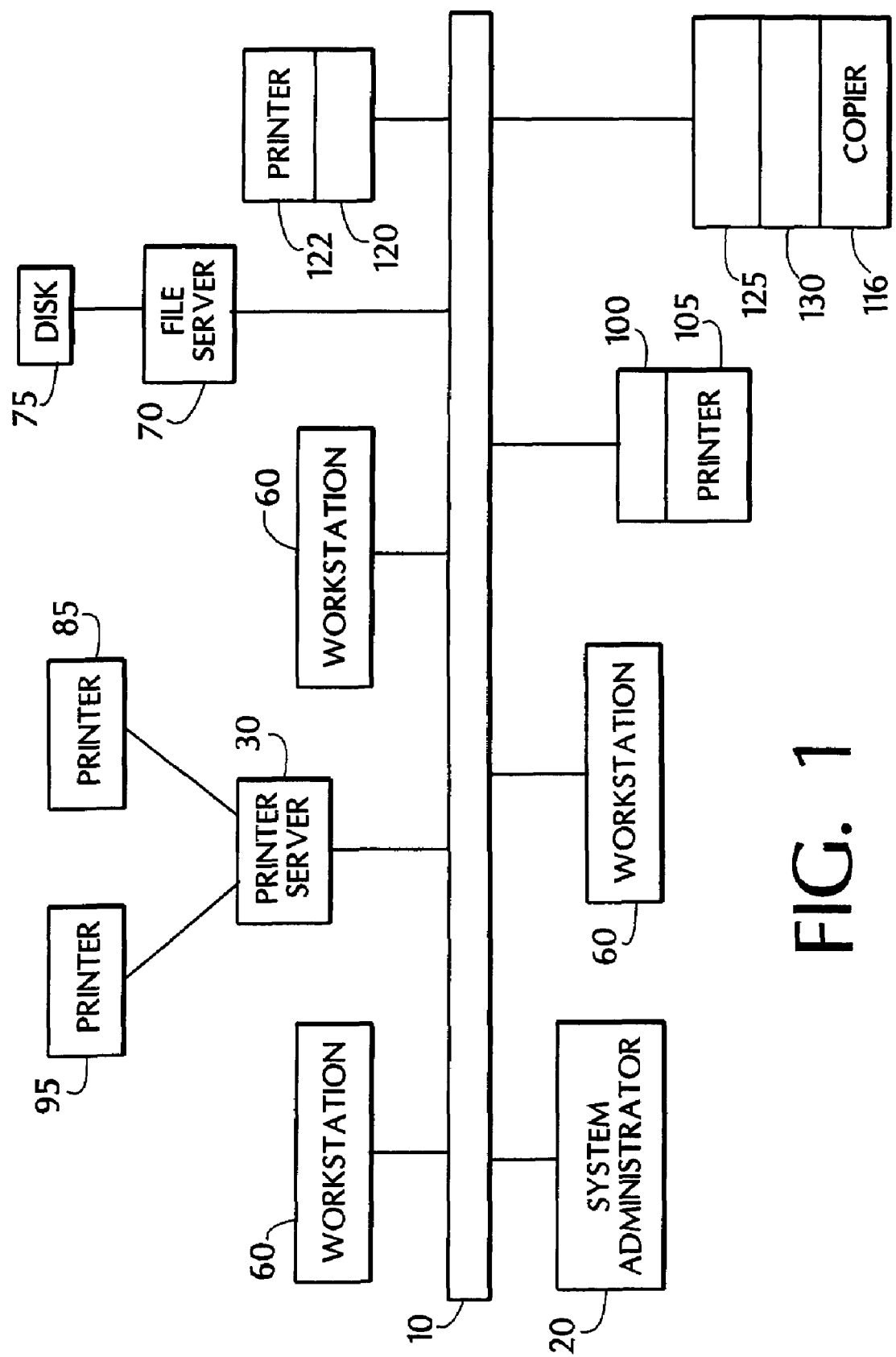
FIG. 1 is a block diagram of an exemplary network system.

A common problem in a network system is that certain resources, such as memory, are substantially consumed by devices, such as computers, connected to the network system. This causes other devices connected to the system to delay executing the same process. Thus, urgent/important processes are unable to be accessed by these devices. This is because the computer system has a limited number of finite resources. After a threshold of these resources has been reached, the entire system can fail.

Accordingly, the present inventor has discovered a method that can control access to resources in a network system in an optimal manner. The preferred method includes a software tool that can be programmed into a device connected to the system. In accordance with the preferred method, the software tool can be used to model a resource of the network. The software tool which will be referred to as a "leaky bucket" and may have a hole in its bottom. In accordance with the preferred method, this bucket may have three characteristics. First, water may be poured into the bucket. However, the bucket will become full if too much water is poured into the bucket. Second, water may flow out of the hole in the bottom of the bucket at a constant rate. Thus, water may be poured into the bucket at this constant rate. Finally, if the bucket is not full of water, additional water may be poured into the bucket at a rate that is higher than the rate at which water flows out of the hole. However, the size of the bucket sets a maximum value for the amount of water that can be added into the bucket.

The network system may be an embedded system. An embedded system is a special purpose networking environment in which all processes cooperate to achieve a common goal. Certain examples of such a system include a network router, a telephone switch, and an industrial control system. Preferably, the software tool is accessible through a programming interface. Further, the software tool is an abstract object. This means that the software tool is not directly associated with a queue or any other object in the system.

The preferred method for allocating computer resources in a network is a software tool that a programmer may explicitly set-up and use when writing code for a particular device connected to the network, such as a network switch, a computer, or other similar network device. Alternatively, the manufacturer of an embedded system could implement, as a standard programming practice, that all of the programmers use the preferred method for accessing specific resources in a specific manner. In the preferred method, the leaky bucket is created for each resource. The preferred method may be programmed in a suitable programming language, such as C, C++, Ada, Pascal, Fortran, Java, or assembly language. Examples of resources that can be regulated include memory, disk access, and system process time.

FIG. 1 illustrates a block diagram of an example network in which the preferred method may be used. The preferred method may also be used in any real-time networking environment. FIG. 1 illustrates a LAN 10 as an Ethernet medium that has a bus-type architecture. A token-ring medium having a ring-type architecture can also be used. Connected to the LAN 10 is a personal computer (PC) 20 which may serve as a system administrator's computer, a PC 30 which can serve as a print server for printers 85 and 95 and workstations 60. The workstations 60 is any general purpose or dedicated computer including PCs, Apples, Unix, and other computer workstations that can run an operating system. For example, the operating system may be a windows-based operating system. A file server 70 may allow shared access to a network disk 75 and a network expansion board 100 can permit shared access to a printer 105. A network expansion device 120 may provide shared access to a printer 122. In addition, a network interface 125 can allow shared access to a copier 116 via a multiple device controller 130.

In operation, the workstations 60 may access resources from other devices connected to the LAN 10. In some cases, multiple workstations 60 will attempt to access resources from the connected devices. However, if a number of stations 60 attempt to access the same resource, such as a server or another computer attached to the network, the resources in the server or computer may not be sufficient to accommodate all the requests from the multiple workstations 60. Further, a single workstation 60 may be able to acquire all the resources in the server. This means that no resources will be available for the other workstations 60.

An example of a programming interface in accordance with the preferred method is as follows. This example is set forth in detail in Appendix A and incorporated herein by reference. A simplification of the example described in Appendix A follows. The leaky bucket may be created by a programmer or embedded in a system by executing the following routine CreateLeakyBucket. In accordance with the preferred method, the CreateLeakyBucket function may be invoked when a work station 60 is initialized or at some other time while the station 60 is connected to the network.

| | | |
|---|---|---|
| t_return | /*RET | Error code */ |
| CreateLeakyBucket( | | |
| t_leaky_bucket *pBucket, | /*IN | Address of leaky bucket descriptor */ |
| dword c, | /*IN | Drain amount every t µs */ |
| dword m, | /*IN | Fill Level maximum */ |
| dword t) | /*IN | Time in µs between drains */ |

A leaky bucket descriptor having the above form t_leaky_bucket may be allocated by the station 60 that invokes the CreateLeakyBucket routine. The descriptor may be stored in a memory of the workstation 60.

In the preferred method, each leaky bucket has a "Fill Level". A Fill Level may be defined as a current usage of a resource controlled by the leaky bucket. When a programmer uses the bucket, a numerical value representing the desired amount of resource usage is added to the Fill Level. After a pre-defined period, for example, t microseconds, a value "c" is subtracted from the Fill Level. The value c may be defined as an estimate of how much of a resource is available (i.e., not being used by another process) every t microseconds. Preferably, the Fill Level does not fall below zero.

The bucket size "m" is the maximum allowed Fill Level in the bucket. The difference between the maximum Fill Level and a current Fill Level is called the "credit".

The following functions may also be implemented for configuring the leaky bucket in accordance with the preferred method:

ModifyLeakyBucket

ModifyLeakyBucket modifies the parameters m, t, c of a leaky bucket created by calling the routine CreateLeakyBucket. Preferably, the current Fill Level in the leaky bucket is not changed during this routine. The current Fill Level may also not change for a current Fill Level that is greater than the maximum Fill Level m.

| | | |
|---|---|---|
| t_return | /*RET | Error code */ |
| CreateLeakyBucket( | | |
| t_leaky_bucket *pBucket, | /*IN | Address of leaky bucket descriptor */ |

-continued

| | | |
|---|---|---|
| dword c, | /*IN | Drain amount every t μs */ |
| dword m, | /*IN | Fill Level maximum */ |
| dword t) | /*IN | Time in μs between drains */ |

CreditLeft

CreditLeft returns the remaining credit to the station 60 using a specified leaky bucket. This routine permits a requesting station 60 to determine if the leaky bucket has an adequate Fill Level to execute the requested resource.

| | | |
|---|---|---|
| sdword | /*RET | Credit left */ |
| CreditLeft( | | |
| t_leaky_bucket *pBucket; | /*IN | Address of leaky bucket descriptor */ |

UseLeakyBucket

UseLeakyBucket increments the Fill Level on a specified leaky bucket by a specified amount. This route returns TRUE if the Fill Level can be incremented without the bucket overflowing. This means that a station 60 can access the requested resource. If the available credit is less than AMOUNT, the requested usage of a resource by a station 60, or if another station 60 is waiting to use the requested resource, the Fill Level is not incremented, and the function returns FALSE. This means that a requesting station 60 is generally unable to use the resource until some later time, when enough credit is available to handle the request from the station 60.

| | | |
|---|---|---|
| bool | /*RET | Success */ |
| UseLeakyBucket( | | |
| t_leaky_bucket *pBucket, | /*IN | Address of leaky bucket descriptor */ |
| dword amount, | /*IN | Usage amount */ |
| dword maxi, | /*IN | Alternative maximum (or 0 for default) |
| */ | | |
| t_leaky_bucket_request *pmsgReq); | /*IN | Leaky bucket request message */ | maxi and pmsqReg

If a station 60 using the leaky bucket discovers that the requested usage of resources is not available, the station can attempt to use the resource at some later time. Alternatively, it can use a different resource. The station may also request the leaky bucket mechanism to inform it when the resources are available. In this case, the operating system of the network can be instructed to call the routine pmsgReq. This causes a message to be sent to the requesting station 60 when the requested usage is available.

For example, the argument pmsqReq of t_leaky_bucket request*pmsgReq may be NULL to indicate no message should be sent or the network address of a station 60. For a specified network address, the notification message will be sent to the station 60 when the desired credit is available. Before this message is sent, the Fill Level is preferably incremented by at least the amount needed to satisfy the amount of the requested usage.

The parameter maxi may be assigned to a numerical value to specify a maximum Fill Level to be used greater than the value m specified when the leaky bucket was initially created. This can be used when a station 60 requests usage of a resource that would exceed the limits c, t, m of the system. For example, if the resource is important or has a high priority level, maxi may be set to a high numerical value to override the initial maximum Fill Level m. This allows an important or critical process, such as in a nuclear reactor system, to access a resource for a greater period of time to execute the process. If the process is not important, the value of m is set to logical zero (0). Accordingly, using maxi can vary the credit available for requested resource.

DestroyLeakyBucket

DestoryLeakyBucket prevents a timer t from further decrementing the Fill Level. After this function has been called, there will be no external references to the leaky bucket, and the memory previously occupied by the leaky bucket descriptor t_leaky_bucket initiated by calling CreateLeakyBucket may be used for other purposes by the station 60.

| | | |
|---|---|---|
| void | | |
| DestoryLeakyBucket( | | |
| t_leaky_bucket *pBucket; | /*IN | Address of leaky bucket descriptor */ |

The following function is an example using the above software tool in accordance with the preferred method. This example uses a leaky bucket with a leaky bucket descriptor &Bucket to allocate the usage of memory in the network system. If the memory can be allocated, as determined by the above UseLeakyBucket routine, the memory is allocated and the function returns OK to indicate that the memory can be allocated. If the leaky bucket does not have enough credit to satisfy the requested usage, the memory is not allocated and the function returns NO_CREDIT.

| | | |
|---|---|---|
| t_return | /*RET | Error code */ |
| allocate_memory( | | |
| int size, | /*IN | Size of memory to allocate */ |
| void **address) | /*OUT | Address of allocated memory */ |
| { | | |
| if(!UseLeakyBucket (&bucket, size, 0, NULL)) | | |
| return NO_CREDIT; | | |
| else { | | |
| *address = malloc(size); /* This is the actual memory allocation */ | | |
| return OK; | | |
| } | | |
| } | | |

The preferred method can be used in real-time environments including industrial process control, weapons systems, network interfaces, and the distribution of power between computation intensive tasks. The preferred method can also be used in a general purpose computing environment.

The preferred method uses a leaky bucket mechanism to enforce voluntary restraint on usage of resources by competing processes. This is a power tool for designers of embedded systems to regulate the usage of resources in an efficient and flexible manner. Further, the preferred method gives programmers the flexibility to request additional usage time for important process request or even to disregard this limitation. Thus, resources can be allocated in a specified manner to favor use for more important processes.

The methods and mechanisms described here are not limited to any particular hardware or software configuration, or to any particular communications modality, but rather they may find applicability in any communications or computer network environment.

The techniques described here may be implemented in hardware or software, or a combination of the two. Preferably, the techniques are implemented in computer programs executing one or more programmable computers that each includes a processor, a storage medium readable by the processor (including volatile and non-volatile memory and/or storage elements), and suitable input and output devices. The programmable computers may be either general-purpose computers or special-purpose, embedded systems. In either case, program code is applied to data entered with or received from an input device to perform the functions described and to generate output information. The output information is applied to one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk, magnetic diskette, or memory chip) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

A number of embodiments of the present invention have been described. Nevertheless, it will be understood that various modifications may be made without departing from the spirit and scope of the invention. Accordingly, other embodiments are within the scope of the following claims.

What is claimed is:

1. A method comprising:
    representing, by an aggregate current usage value, a total amount of a resource that is managed by software tool and is theoretically currently in use in the aggregate by a first process and a second process;
    associating with the first process a first maximum value of the aggregate current usage value;
    associating with the second process a second maximum value of the aggregate current usage value;
    adjusting at least one of the first maximum value and the second maximum value;
    decreasing the aggregate current usage value according to a function of time; and
    in response to a request by one of the processes for additional use of the resource, allowing the process to make the requested additional use and increasing the aggregate current usage value by the amount of requested additional use to a new aggregate current usage value, and sending a message to a network address associated with the requesting process to notify the requesting process that additional use of the resource is allowed, provided that the new aggregate current usage value would not exceed the maximum value associated with that process.

2. The method of claim 1, wherein the resource comprises one of memory space and system processor time.

3. The method of claim 1, wherein the resource is in an embedded computer system.

4. The method of claim 1, wherein the resource is in a real-time networking environment.

5. The method of claim 1, wherein the software tool is modeled as a leaky bucket.

6. The method of claim 1, further comprising:
    determining a priority of the resource; and
    allocating the resource based on the priority of the resource.

7. The method of claim 1, further comprising calculating an available amount of credit by a difference between the maximum value and the aggregate current usage value.

8. The method of claim 1 wherein decreasing the aggregate current usage value according to a function of time comprises decreasing the aggregate current usage value per unit of time by an estimated value of the resource that becomes available per unit of time.

9. The method of claim 1, further comprising:
    determining a priority of a process accessing the resource; and
    allocating the resource based on the priority of the process.

10. The method of claim 1 in which decreasing the aggregate current usage value according to a function of time comprises decreasing the current usage value by a preset amount per unit of time.

11. The method of claim 10 further comprising regulating use of the resource based on the decreasing of the aggregate current usage value so that the total amount of use of the resource does not exceed the preset amount per unit of time.

12. The method of claim 10 in which the preset amount represents an estimated amount of resource that becomes available per unit of time.

13. The method of claim 1, further comprising, if the requested additional use plus the aggregate current usage value would exceed the maximum value associated with the requesting process, waiting for a period of time until the aggregate current usage value decreases to below a level such that increasing the aggregate current usage value based on the amount of requested additional use would not exceed the maximum value associated with the requesting process.

14. The method of claim 1 in which the decreases of the aggregate current usage value is independent of the amount of use of the resource by the processes.

15. A method comprising:
    in a network having resources that are accessed by a first device and a second device, for each resource, creating a software tool on each device that uses the resource to manage usage of the resource by the device; and
    for each software tool that is used to manage a particular resource used by a particular device,
        using an aggregate current usage value to represent a total amount of the particular resource that is managed by the software tool and is theoretically currently in use in the aggregate by both the first and the second devices,
        associating with the first device a first maximum value of the aggregate current usage value,
        associating with the second device a second maximum value of the aggregate current usage value,
        adjusting at least one of the first maximum value and the second maximum value;
        decreasing the aggregate current usage value according to a function of time, and
        in response to a request by one of the devices for additional use of one of the resources, allowing the device to make the requested additional use and increasing the aggregate current usage value by the amount of requested additional use to a new aggregate current usage value, and sending a message to a network address associated with the requesting process to notify the requesting process that additional use of the resource is allowed, provided that the new aggregate current usage value would not exceed the maximum value associated with the requesting device.

16. The method of claim 15, wherein creating the software tool comprises: allocating a descriptor representative of the software tool for each of the plurality of devices accessing the resource managed by the software tool.

17. The method of claim 15, further comprising: decrementing the maximum value of the software tool in response to the use of the resource associated with the software tool by any device.

18. The method of claim 17, further comprising incrementing the maximum value to be equal to or more than a usage level requested by the device.

19. The method of claim 17, further comprising overriding the maximum value to allow a device access to one of the plurality of resources.

20. The method of claim 17, further comprising providing a device waiting to use the resource information on the amount of resource that is available based on a difference between the maximum value and the aggregate current usage value.

21. The method of claim 20, further comprising sending a message to a network address associated with a device waiting to use the resource when the available amount of resource exceeds a specified usage level.

22. The method of claim 15, further comprising destroying the software tool in response to a request from one of the devices.

23. The method of claim 15 in which different software tools on different devices that are associated with a common resource have different specified maximum values.

24. A machine accessible medium, which when accessed results in a machine performing operations comprising:
   representing, by an aggregate current usage value, a total amount of a resource that is managed by a software tool and is theoretically currently in use by both a first device and a second device;
   associating with the first device a first maximum value of the aggregate current usage value,
   associating with the second device a second maximum value of the aggregate current usage value,
   adjusting at least one of the first maximum value and the second maximum value;
   decreasing the aggregate current usage value according to a function of time; and
   in response to a request by one of the devices for additional use of the resource, allowing the device to make the requested additional use and increasing the aggregate current usage value by the amount of requested additional use to a new aggregate current usage value, and sending a message to a network address associated with the requesting process to notify the requesting process that additional use of the resource is allowed, provided that the new aggregate current usage value would not exceed the maximum value associated with the requesting device.

25. The machine accessible medium of claim 24, wherein the resource comprises one of memory space and system processor time.

26. The machine accessible medium of claim 24, wherein the software tool is modeled as a leaky bucket.

27. The machine accessible medium of claim 24, which when accessed results in the machine performing operations comprising adjusting the associated maximum value.

28. A network including a plurality of devices, comprising:
   a plurality of resources running in the network; and
   computer software, residing on a computer readable medium at each device accessing the plurality of resources to cause the device to perform the following operations:
      representing, by an aggregate current usage value, a total amount of a resource that is managed by a software tool and is used by at least a first device and a second device;
      associating with the first device a first maximum value of the aggregate current usage value;
      associating with the second device a second maximum value of the aggregate current usage value;
      decreasing the aggregate current usage value according to a function of time; and
      adjusting at least one of the first maximum value and the second maximum value;
      in response to a request by one of the first and second devices for additional use of the resource, allowing the device to make the requested additional use and increasing the aggregate current usage value by the amount of requested additional use to a new aggregate current usage value, and sending a message to a network address associated with the requesting process to notify the requesting process that additional use of the resource is allowed, provided that the new aggregate current usage value would not exceed the maximum value associated with the requesting device.

29. The network of claim 28, wherein the plurality of resources comprise memory space or system processor time.

30. The network of claim 28, wherein the network comprises an embedded computer system.

31. The network of claim 28, wherein the network operates in a real-time networking environment.

* * * * *